United States Patent [19]

Bodor

[11] 3,737,196
[45] June 5, 1973

[54] ANIMAL TOY

[76] Inventor: Mary Elizabeth Bodor, 32135 Bingham Road, Birmingham, Mich. 48010

[22] Filed: July 1, 1971

[21] Appl. No.: 158,909

[52] U.S. Cl.....................................297/181, 46/158
[51] Int. Cl. ..........................A63g 9/10, A63h 3/02
[58] Field of Search.....................397/181, 218, 219; 46/151, 153, 158

[56] References Cited

UNITED STATES PATENTS

| 3,008,763 | 11/1961 | Lebow | 297/181 |
| 2,274,303 | 2/1942 | Ornstein | 46/158 |
| 1,982,516 | 11/1934 | Holmested | 297/219 X |

Primary Examiner—Paul R. Gilliam
Attorney—McGlynn, Reising, Milton & Ethington

[57] ABSTRACT

An animal toy comprising a supporting frame in a form of a stool adapted to support a young child mounted astride the stool, the stool having a body member with legs depending therefrom and a neck member projecting upwardly from one end of the body member, and a removable covering of flexible material for the stool having a simulated animal configuration. The covering includes a filled head portion, a neck portion depending from the head portion and enveloping the neck member, a body portion extending from the neck portion and enveloping the body member of the stool, and a plurality of sleeves depending from the body portion, each receiving one of the legs of the stool. Coverings have different animal configurations can be interchangeably mounted on the same supporting frame.

1 Claim, 10 Drawing Figures

INVENTOR.
Mary Elizabeth Bodor
BY
Barnard, McGlynn & Reising
ATTORNEYS

PATENTED JUN 5 1973 3,737,196

INVENTOR.
Mary Elizabeth Bodor
BY
Barnard, McDlynn & Reising
ATTORNEYS

3,737,196

ANIMAL TOY

This invention relates generally to toy animals, and is particularly concerned with construction of toy animals that can be ridden, sat on, or pulled by a child.

The prior art includes dolls and animal toys having a body form with a removable covering marked and shaped to simulate a human or animal figure. The coverings can be removed, cleaned, and reinstalled on the body form. Coverings having different markings can be used on the same form, and in some cases, the coverings may have different markings or coats on opposite sides so that by reversing the covering, different outer appearances can be obtained. Generally, the body form has substantially the same configuration as the covering so as to maintain the covering in its desired shape.

Examples of prior art toys of this general type are disclosed in U.S. Pat. Nos. 1,023,401; 1,099,208; 1,307,218; 1,485,638 and 1,966,986 as well as in French patents 932,525 and 1,129,446; and Austrian patent 96,254.

An object of this invention is to provide a toy animal having a padded stool serving as a supporting frame or body form which is capable of supporting removable coverings of different animal configurations so that the stool can be used interchangeably with separate coverings simulating, for example, zebras, elephants, giraffes, camels, and so forth, having a variety of shapes and configurations.

A further object is to provide a toy animal that can be sat on, ridden, or pulled about by a young child, and which may have several interchangeable removable coverings of a variety of shapes and configurations to simulate different animals.

In carrying out the foregoing, and other objects, a toy according to the present invention includes a supporting frame in the form of a stool having sufficient strength to support a young child mounted astride the stool, the stool having a body member with legs depending therefrom for supporting the body member above the surface of a floor and a neck member projecting upwardly from one end of the body member. The stool may be covered throughout with soft, resilient padding. A removable covering of flexible material having a simulated animal configuration can be applied to and removed from the stool. The covering includes a filled head portion, a neck portion depending from the head portion to envelop the neck member of the stool, and a body portion extending from the neck portion to envelop the body member of the stool. A plurality of sleeves depends from the body portion to receive the legs of the stool to define the legs of the animal.

Rollers may be mounted on the legs so that the animal can be rolled around the floor with a child astride the animal, or may be pulled around the floor by the child.

The stool has a configuration such that a plurality of coverings can be alternately applied to the stool, each of the coverings simulating a different animal. The removed covering can be used as a puppet, or can be filled with suitable stuffing to become a conventional stuffed animal when not mounted on the stool.

Other objects, advantages and features of the invention will become apparent from the following description taken in connection with the accompanying drawings in which.

Figure 1:
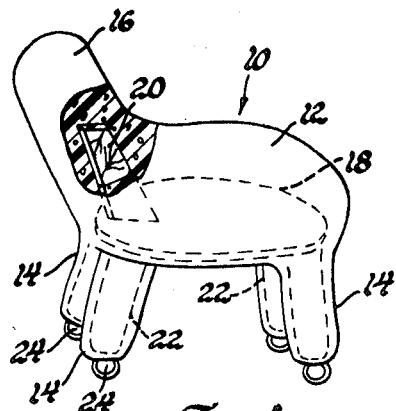
FIG. 1 is a perspective view of the padded stool serving as the supporting frame or form for the several different animal configurations.

In FIG. 1, reference numeral 10 collectively designates a padded stool which serves as a supporting frame or body form for the animal toy. The stool 10 has sufficient strength to support a young child mounted astride the stool, and includes a body member 12 with legs 14 depending therefrom and a neck supporting member 16 projecting upwardly from the forward end of the body member 12. The stool 14 includes a rigid seat or body frame member 18 of wood, plastic or other rigid material with leg frame members 22 depending therefrom, and a peg 20 serving as a neck frame member projecting upwardly from the seat or body frame member 18. The rigid seat member 18, leg frame members 22 and peg 20 are covered with soft, resilient padding. Rollers or conventional caster wheels 24 are mounted in the end of each of the rigid leg frame members 22.

Figure 2:
FIG. 2 is a perspective view of the stool of FIG. 1 with a covering partially applied to the stool, a portion of the covering being broken away to expose a head shaping form carried in the covering.
Figure 3A:
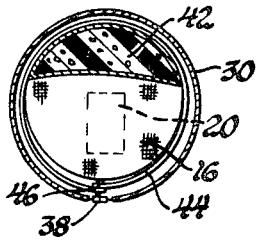
FIG. 3a is a sectional view taken on lines 3a—3a of FIG. 3.

Reference numeral 26 collectively designates a covering of flexible material for the stool 10, the covering having a simulated animal configuration. For example, as shown in FIG. 2, the covering 26 has a configuration and the markings of a zebra.

The covering includes a filled head portion 28, a neck portion 30 depending from the head portion to envelop the neck member 16, a body portion 32 extending from the neck portion and enveloping the body member 12 of the stool 10, and a plurality of leg sleeves 34 extending from the body portion, each receiving one of the legs 14 of the stool 10.

The covering 26 includes a slit 36 through which the covering is applied to and removed from the stool 10. The slit 36 extends from the forward side of the neck portion 30 along the bottom side of the body portion 32 and may be closed by a conventional zipper or slide fastener 38.

The head portion 28 of the covering 26 is filled with a head shaping form 40 having the shape of the head of the animal simulated by the covering. The head shaping form 40 may be of resilient foam plastic material and includes an extension 42 projecting into the neck portion 30. A strap 44 is secured by stitching or other conventional means to the extension 42 and can be wrapped around the neck supporting member 16 to secure the head portion to the stool 10. Hooks or snap fasteners 46 may be provided on the ends of the strap 44 to secure the ends together when the strap is wrapped around the neck member 16.

Figure 4:
FIG. 4 is a perspective view of the covering completely removed from the stool of FIG. 1 and illustrating the manner in which the covering can be used as a puppet.
Figure 5:
FIG. 5 is a perspective view of the covering filled with pillows or other suitable stuffing when removed from the stool support of FIG. 1.

By opening the slide fastener 38, the slit 36 can be opened to insert the entire stool 10 into the covering 26. With each leg 14 inserted into one of the sleeves 34, and the strap 44 secured around the neck member 16, the slide fastener 38 can be closed, and the toy has the configuration shown in FIG. 3. A child can sit astride the back of the simulated zebra, or the toy can be pulled over the floor on the rollers 24. With the covering 24 removed as shown in FIG. 4, it can be used as a puppet, or it can be filled with a pillow or other suitable stuffing and used as a stuffed animal as shown in FIG. 5. Covers 47 in a form to simulate hooves may be inserted over the ends of the leg sleeves 34 to close the open ends thereof.

Figure 6:
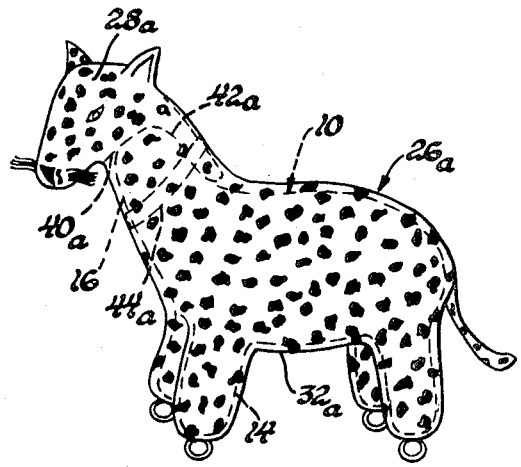
FIGS. 6 through 9 are perspective views illustrating coverings simulating the various animals that can be interchangeably applied to the same stool supporting frame of FIG. 1.

Coverings having different configurations from the covering 26 may be applied to the stool 10 as shown in FIGS. 6 through 9. In FIG. 6, a covering 26a simulating a leopard is mounted on the stool 10. As in the embodiment of FIGS. 2 and 3, the covering 26a includes a filled head portion 28a having a head shaping form 40a which is shown in part in broken lines. The head shaping form 40a is formed with an extension 42a as in the previously described embodiment. A strap 44a may be secured to the extension 42a to be wrapped around the neck member 16.

Figure 8:
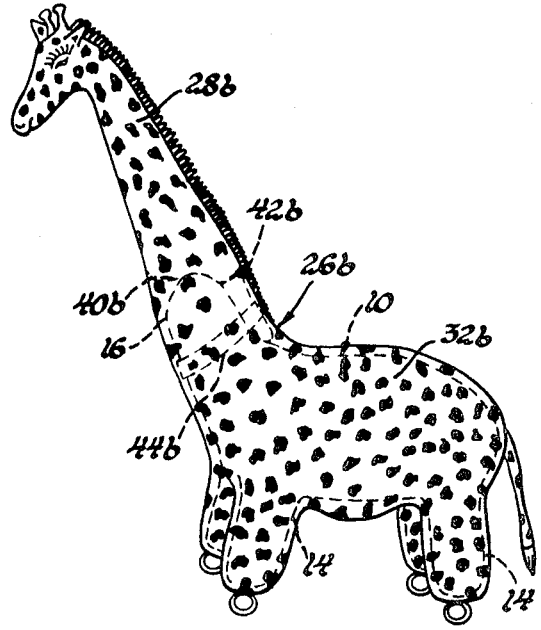

In FIG. 8, a covering 26b is mounted on the stool 10, the covering 26b having the configuration and markings of a giraffe. The covering 26b includes a filled head portion 28b, the head portion 28b being filled with a head shaping form 40b having an extension 42b with a strap 44b to be wrapped around the neck member 16 of the stool 10. The head shaping form 40b fills the head of the giraffe as well as the portion of the neck above the neck member 16.

Figure 7:
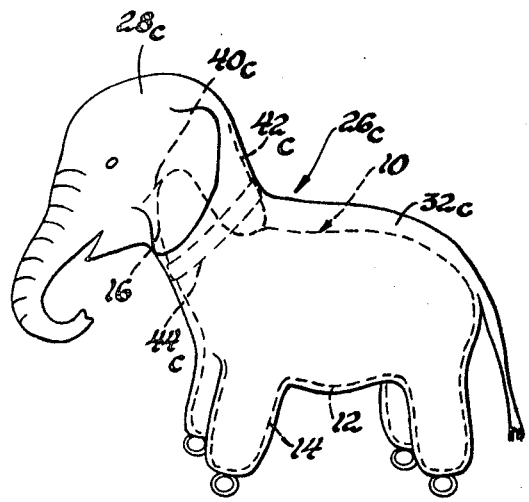

In FIG. 7, a covering 26c is mounted on the stool 10, the covering 26c having the configuration of an elephant. The covering 26c includes a head portion 28c filled with a head shaping form 40c with an extension 42c having a strap 44c secured thereto to by wrapped around the neck member 16 of the stool 10.

Figure 9:
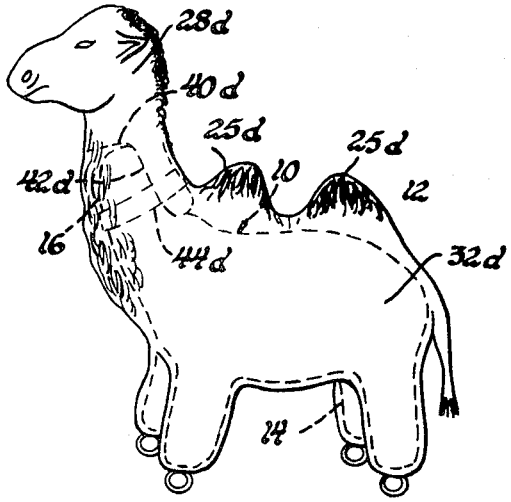

In FIG. 9, a covering 26d having the configuration and markings of a camel is mounted on the stool 10. The covering 26d includes a head portion 28d filled with a head shaping form 40d having an extension 42d. A strap 44d identical to the strap 44 of FIG. 2 is secured to the extension 42d and is wrapped around the neck member 16. The hump portions 25d of the body portion 32d may be filled with foam or other suitable cushioning material to maintain the shape of the humps.

Figure 3:
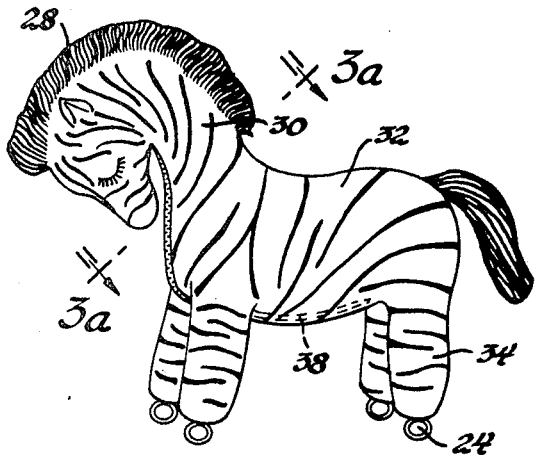
FIG. 3 is a perspective view of the toy with the covering completely applied to the stool of FIG. 1.

Each of the coverings 26a, b, c and d of FIGS. 6 through 9 are also provided with a slit identical to the slit 36 of the embodiment of FIGS. 2 and 3 which may be closed by a conventional slide fastener.

The head shaping forms 40, 40a, b, c and d for filling the head portions 28, 28a, 28b, 28c and 28d, respectively, may be of foam rubber, polyethylene, polyurethane and similar materials. The entire covering can be removed from the stool 10 and washed or dry cleaned, depending on the particular fabric or material used in the individual animal covering. For example, corduroy or smooth cotton material can be used for some of the animals and can be washed. Imitation fur material for bears and similar animals are usually preferably dry cleaned.

While specific embodiments of the invention have been disclosed in the accompanying drawings and described in the foregoing specification, it should be understood that the invention is not limited to the exact constructions shown. Alterations in the construction and arrangement of parts, all falling within the scope and spirit of the invention, will be apparent to those skilled in the art.

I claim:

1. An animal toy comprising: a supporting frame in the form of a stool having a body member with legs depending therefrom and a neck supporting member projecting upwardly from one end of said body member; said body member and neck supporting member being covered with resilient padding; a roller mounted on the end of each of said legs; a removable covering of flexible material for said stool having a simulated animal configuration, said covering including a head portion; a head shaping form received in and filling said head portion, said head shaping form having the shape of the head of the head of the animal simulated by said covering, an extension depending from said head shaping form and engaging said neck supporting member; said covering further including a neck portion depending from said head portion and enveloping said neck supporting member and said extension, a body portion extending from said neck portion and enveloping the body member of said stool, and a plurality of sleeves depending from said body portion each receiving one of the legs of said stool; and flexible attaching means secured to said extension and wrapped around said neck supporting member for securing said head shaping form in position with respect to said stool.

* * * * *